(12) United States Patent
Mantell

(10) Patent No.: US 8,928,937 B2
(45) Date of Patent: Jan. 6, 2015

(54) METHOD AND SYSTEM FOR ASSIGNING COLOR VALUES TO PRIMARY COLORS AND SECONDARY COLORS FOR COLOR RENDERING IN AN INKJET PRINTER

(75) Inventor: David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 916 days.

(21) Appl. No.: 12/975,740

(22) Filed: Dec. 22, 2010

(65) Prior Publication Data

US 2012/0162672 A1  Jun. 28, 2012

(51) Int. Cl.
*G06F 15/00* (2006.01)
*H04N 1/60* (2006.01)
*H04N 1/54* (2006.01)

(52) U.S. Cl.
CPC .............. *H04N 1/6016* (2013.01); *H04N 1/54* (2013.01)
USPC ......... 358/1.9; 358/3.23; 358/3.06; 358/3.26; 358/534; 358/533; 358/529; 358/518; 358/3.03; 382/162; 347/251

(58) Field of Classification Search
None
See application file for complete search history.

(56) References Cited

U.S. PATENT DOCUMENTS

| | | | |
|---|---|---|---|
| 5,673,121 A | 9/1997 | Wang | |
| 6,014,500 A | 1/2000 | Wang | |
| 6,191,874 B1 * | 2/2001 | Yamada et al. | ............... 358/529 |
| 6,252,675 B1 | 6/2001 | Jacobs | |
| 6,867,884 B1 | 3/2005 | Rozzi | |
| 7,095,530 B2 | 8/2006 | Mantell et al. | |
| 7,136,189 B2 | 11/2006 | Sharma et al. | |
| 7,719,722 B2 | 5/2010 | Sharma et al. | |
| 7,751,088 B2 | 7/2010 | Yamazaki et al. | |

\* cited by examiner

*Primary Examiner* — Paul F Payer
(74) *Attorney, Agent, or Firm* — Maginot Moore & Beck LLP

(57) ABSTRACT

A method enables primary color values for pixel to be processed before the pixel is rendered. The method includes allocating non-black primary colors as being under black, secondary colors, or tertiary colors.

19 Claims, 2 Drawing Sheets

METHOD AND SYSTEM FOR ASSIGNING COLOR VALUES TO PRIMARY COLORS AND SECONDARY COLORS FOR COLOR RENDERING IN AN INKJET PRINTER

TECHNICAL FIELD

This disclosure relates generally to color rendering in an inkjet printer, and, more particularly, to the color values used for color rendering in such printers.

BACKGROUND

Vector halftone methods are typically used to render color separations for the printing of images in an inkjet printer. In such a method, a single stochastic screen is used to render all colors. For each pixel, the input color values for the primary colors are used to calculate the primary and secondary colors for a pixel. Then these colors are added in some predetermined order and the sum is compared to a threshold after each addition. When the sum exceeds the threshold for a pixel, the pixel is assigned to that color.

The conversion of primary color inputs to primary, secondary, tertiary, and quaternary color values for a pixel may be done in different ways. In one process, the conversion is done in a manner that minimizes ink by eliminating color under black and limiting secondary color output to only one of the secondary colors, red, green, or blue for a pixel. The letters R, G, and B are used in this document to denote the red, green, and blue secondary colors, respectively. Other process may use the approach described above and add color to be put under black to enhance the optical density of the image. Another method removes only enough color to eliminate any tertiary colors and then the secondary colors are apportioned to make the minimum amount of blue needed to ensure no tertiary colors are assigned and the green secondary color is maximized over red with the remaining amount of needed secondary color.

Vector halftone methods can be affected by ink drop placement errors. Ink drop placement errors occur because inkjets may not eject ink drops perpendicularly with respect to the face of the printhead. These off-angle ink drops land at locations other than were they are expected to land. Some printheads are oriented at an angle with respect to the width of the image receiving member. This angle is sometimes known as printhead roll in the art and printhead roll may also contribute to ink drop placement errors. Consequently, reducing the effect of ink drop placement on the images printed by a printer is a worthwhile goal in inkjet printing systems.

SUMMARY

A new method has been developed that converts input color values to color values that enable color rendering methods to produce halftone images that are more robust to ink drop placement errors. The method includes receiving from a memory a color value for each primary color to be printed for a pixel, identifying an amount of non-black color under black color for the pixel with reference to the color values received for each primary color for the pixel, and identifying a total amount of non-black color for secondary colors associated with the pixel, the identification of the total amount of non-color for secondary colors being made with reference to the amount of non-black color under black color for the pixel and the color values received for each primary color for the pixel.

A printer may be configured to use the method of converting input color values. The printer includes a print station having at least one printhead that is configured to eject liquid ink onto an image receiving surface, a controller configured to generate firing signals to operate the at least one printhead to eject ink onto the image receiving surface, and a print engine configured to receive a color value for each primary color to be printed for a pixel, to identify an amount of non-black color under black color for the pixel with reference to the color values received for each primary color for the pixel, and to identify a total amount of non-black color for secondary colors associated with the pixel, the identification of the total amount of non-black color for secondary colors being made with reference to the amount of non-black color under black color for the pixel and the color values received for each primary color for the pixel.

BRIEF DESCRIPTION OF THE DRAWINGS

The foregoing aspects and other features of a method and printer that convert input color values for pixels to enhance color rendering in the printer are explained in the following description, taken in connection with the accompanying drawings.

DETAILED DESCRIPTION

Figure 2:
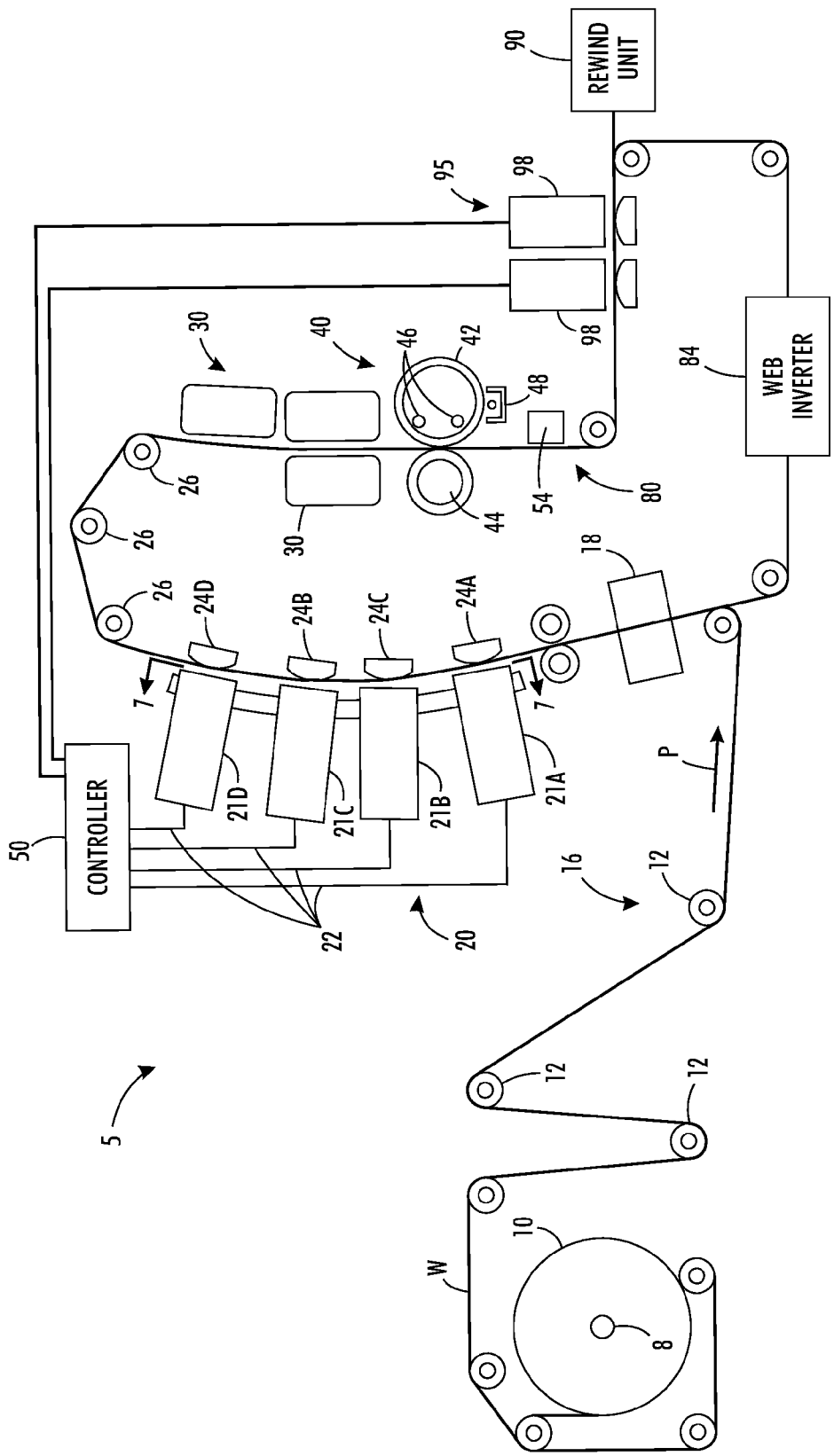
FIG. 2 is a schematic view of an improved inkjet imaging system that ejects ink onto a continuous web of media as the media moves past the printheads in the system.

Referring to FIG. 2, an inkjet imaging system 5 is shown. For the purposes of this disclosure, the imaging apparatus is in the form of an inkjet printer that employs one or more inkjet printheads and an associated solid ink supply. The controller, discussed in more detail below, may be configured to implement the processes discussed below to process color values for image pixels. The image data and methods described herein are applicable to any of a variety of other imaging apparatus that use inkjets to eject one or more colorants to a medium or media.

The imaging apparatus 5 includes a print engine to process the image data before generating the control signals for the inkjet ejectors. One method of processing color image data performed by the print engine is described in more detail below. The print engine may be implemented with one or more of the processors and memories in the controller 50 or it may be implemented with a computer external to the system 5. The colorant may be ink, or any suitable substance that includes one or more dyes or pigments and that may be applied to the selected media. The colorant may be black, or any other desired color, and a given imaging apparatus may be capable of applying a plurality of distinct colorants to the media. The media may include any of a variety of substrates, including plain paper, coated paper, glossy paper, or transparencies, among others, and the media may be available in sheets, rolls, or another physical formats.

Direct-to-sheet, continuous-media, phase-change inkjet imaging system 5 includes a media supply and handling system configured to supply a long (i.e., substantially continuous) web of media W of "substrate" (paper, plastic, or other printable material) from a media source, such as spool of media 10 mounted on a web roller 8. For simplex printing, the printer is comprised of feed roller 8, media conditioner 16, printing station 20, printed web conditioner 80, coating station 95, and rewind unit 90. For duplex operations, the web inverter 84 is used to flip the web over to present a second side of the media to the printing station 20, printed web conditioner 80, and coating station 95 before being taken up by the rewind unit 90. In the simplex operation, the media source 10 has a width that substantially covers the width of the rollers over which the media travels through the printer. In duplex operation, the media source is approximately one-half of the roller widths as the web travels over one-half of the rollers in the printing station 20, printed web conditioner 80, and coating station 95 before being flipped by the inverter 84 and laterally displaced by a distance that enables the web to travel over the other half of the rollers opposite the printing station 20, printed web conditioner 80, and coating station 95 for the printing, conditioning, and coating, if necessary, of the reverse side of the web. The rewind unit 90 is configured to wind the web onto a roller for removal from the printer and subsequent processing.

The media may be unwound from the source 10 as needed and propelled by a variety of motors, not shown, rotating one or more rollers. The media conditioner includes rollers 12 and a pre-heater 18. The rollers 12 control the tension of the unwinding media as the media moves along a path through the printer. In alternative embodiments, the media may be transported along the path in cut sheet form in which case the media supply and handling system may include any suitable device or structure that enables the transport of cut media sheets along a desired path through the imaging device. The pre-heater 18 brings the web to an initial predetermined temperature that is selected for desired image characteristics corresponding to the type of media being printed as well as the type, colors, and number of inks being used. The pre-heater 18 may use contact, radiant, conductive, or convective heat to bring the media to a target preheat temperature, which in one practical embodiment, is in a range of about 30° C. to about 70° C.

The media is transported through a printing station 20 that includes a series of color units 21A, 21B, 21C, and 21D, each color unit effectively extending across the width of the media and being able to place ink directly (i.e., without use of an intermediate or offset member) onto the moving media. As is generally familiar, each of the printheads may eject a single color of ink, one for each of the colors typically used in color printing, namely, cyan, magenta, yellow, and black (CMYK). The controller 50 of the printer receives velocity data from encoders mounted proximately to rollers positioned on either side of the portion of the path opposite the four color units to calculate the linear velocity and position of the web as moves past the printheads. The controller 50 uses these data to generate timing signals for actuating the inkjet ejectors in the printheads to enable the four colors to be ejected with a reliable degree of accuracy for registration of the differently colored patterns to form four primary-color images on the media. The inkjet ejectors actuated by the firing signals corresponds to image data processed by the controller 50. The image data may be transmitted to the printer, generated by a scanner (not shown) that is a component of the printer, or otherwise generated and delivered to the printer. In various possible embodiments, a color unit for each primary color may include one or more printheads; multiple printheads in a color unit may be formed into a single row or multiple row array; printheads of a multiple row array may be staggered; a printhead may print more than one color; or the printheads or portions of a color unit may be mounted movably in a direction transverse to the process direction P, such as for spot-color applications and the like.

Each of color units 21A-21D includes at least one actuator configured to adjust the printheads in each of the printhead modules in the cross-process direction across the media web. In a typical embodiment, each motor is an electromechanical device such as a stepper motor or the like. In a practical embodiment, a print bar actuator is connected to a print bar containing two or more printheads. The print bar actuator is configured to reposition the print bar by sliding the print bar along the cross-process axis of the media web. Printhead actuators may also be connected to individual printheads within each of color units 21A-21D. These printhead actuators are configured to reposition an individual printhead by sliding the printhead along the cross-process axis of the media web. In this specific embodiment the printhead actuators are devices that physically move the printheads in the cross process direction. In alternative embodiments, an actuator system may be used that does not physically move the printheads, but redirects the image data to different ejectors in each head to change head position. Such an actuator system, however, can only reposition the printhead in increments of at least the cross process direction ejector to ejector spacing. As used in this document, "reposition printhead" includes the redirection of image data to different ejectors in a printhead to change the position of images printed by a printhead in ejector increments in the cross-process direction as well as physical movement of printheads.

The printer may use "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. In one embodiment, the phase change ink melting temperature is approximately 70° C. to 140° C. In alternative embodiments, the ink utilized in the imaging device may comprise UV curable gel ink. Gel ink may also be heated before being ejected by the inkjet ejectors of the printhead. As used herein, liquid ink refers to melted solid ink, heated gel ink, or other known forms of ink, such as aqueous inks, ink emulsions, ink suspensions, ink solutions, or the like.

Associated with each color unit is a backing member 24A-24D, typically in the form of a bar or roll, which is arranged substantially opposite the color unit on the back side of the media. Each backing member is used to position the media at a predetermined distance from the printheads opposite the backing member. Each backing member may be configured to emit thermal energy to heat the media to a predetermined temperature which, in one practical embodiment, is in a range of about 40° C. to about 60° C. The various backer members may be controlled individually or collectively. The pre-heater 18, the printheads, backing members 24 (if heated), as well as the surrounding air combine to maintain the media along the portion of the path opposite the printing station 20 in a predetermined temperature range of about 40° C. to 70° C.

As the partially-imaged media moves to receive inks of various colors from the printheads of the color units, the temperature of the media is maintained within a given range. Ink is ejected from the printheads at a temperature typically significantly higher than the receiving media temperature. Consequently, the ink heats the media. Therefore other temperature regulating devices may be employed to maintain the media temperature within a predetermined range. For example, the air temperature and air flow rate behind and in front of the media may also impact the media temperature. Accordingly, air blowers or fans may be utilized to facilitate control of the media temperature. Thus, the media temperature is kept substantially uniform for the jetting of all inks from the printheads of the color units. Temperature sensors (not shown) may be positioned along this portion of the media path to enable regulation of the media temperature. These temperature data may also be used by systems for measuring or inferring (from the image data, for example) how much ink of a given primary color from a printhead is being applied to the media at a given time.

Following the printing zone 20 along the media path are one or more "mid-heaters" 30. A mid-heater 30 may use contact, radiant, conductive, and/or convective heat to control a temperature of the media. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to −10° C. to 20° C. above the temperature of the spreader.

Following the mid-heaters 30, a fixing assembly 40 is configured to apply heat and/or pressure to the media to fix the images to the media. The fixing assembly may include any suitable device or apparatus for fixing images to the media including heated or unheated pressure rollers, radiant heaters, heat lamps, and the like. In the embodiment of the FIG. 2, the fixing assembly includes a "spreader" 40, that applies a predetermined pressure, and in some implementations, heat, to the media. The function of the spreader 40 is to take what are essentially droplets, strings of droplets, or lines of ink on web W and smear them out by pressure and, in some systems, heat, so that spaces between adjacent drops are filled and image solids become uniform. In addition to spreading the ink, the spreader 40 may also improve image permanence by increasing ink layer cohesion and/or increasing the ink-web adhesion. The spreader 40 includes rollers, such as image-side roller 42 and pressure roller 44, to apply heat and pressure to the media. Either roll can include heat elements, such as heating elements 46, to bring the web W to a temperature in a range from about 35° C. to about 80° C. In alternative embodiments, the fixing assembly may be configured to spread the ink using non-contact heating (without pressure) of the media after the print zone. Such a non-contact fixing assembly may use any suitable type of heater to heat the media to a desired temperature, such as a radiant heater, UV heating lamps, and the like.

In one practical embodiment, the roller temperature in spreader 40 is maintained at a temperature to an optimum temperature that depends on the properties of the ink such as 55° C.; generally, a lower roller temperature gives less line spread while a higher temperature causes imperfections in the gloss. Roller temperatures that are too high may cause ink to offset to the roll. In one practical embodiment, the nip pressure is set in a range of about 500 to about 2000 psi. Lower nip pressure gives less line spread while higher pressure may reduce pressure roller life.

The spreader 40 may also include a cleaning/oiling station 48 associated with image-side roller 42. The station 48 cleans and/or applies a layer of some release agent or other material to the roller surface. The release agent material may be an amino silicone oil having viscosity of about 10-200 centipoises. Only small amounts of oil are required and the oil carried by the media is only about 1-10 mg per A4 size page. In one possible embodiment, the mid-heater 30 and spreader 40 may be combined into a single unit, with their respective functions occurring relative to the same portion of media simultaneously. In another embodiment the media is maintained at a high temperature as it is printed to enable spreading of the ink.

The coating station 95 applies a clear ink to the printed media. This clear ink helps protect the printed media from smearing or other environmental degradation following removal from the printer. The overlay of clear ink acts as a sacrificial layer of ink that may be smeared and/or offset during handling without affecting the appearance of the image underneath. The coating station 95 may apply the clear ink with either a roller or a printhead 98 ejecting the clear ink in a pattern. Clear ink for the purposes of this disclosure is functionally defined as a substantially clear overcoat ink or varnish that has minimal impact on the final printed color, regardless of whether or not the ink is devoid of all colorant. In one embodiment, the clear ink utilized for the coating ink comprises a phase change ink formulation without colorant. Alternatively, the clear ink coating may be formed using a reduced set of typical solid ink components or a single solid ink component, such as polyethylene wax, or polywax. As used herein, polywax refers to a family of relatively low molecular weight straight chain poly ethylene or poly methylene waxes. Similar to the colored phase change inks, clear phase change ink is substantially solid at room temperature and substantially liquid or melted when initially jetted onto the media. The clear phase change ink may be heated to about 100° C. to 140° C. to melt the solid ink for jetting onto the media.

Following passage through the spreader 40 the printed media may be wound onto a roller for removal from the system (simplex printing) or directed to the web inverter 84 for inversion and displacement to another section of the rollers for a second pass by the printheads, mid-heaters, spreader, and coating station. The duplex printed material may then be wound onto a roller for removal from the system by rewind unit 90. Alternatively, the media may be directed to other processing stations that perform tasks such as cutting, binding, collating, and/or stapling the media or the like.

Operation and control of the various subsystems, components and functions of the device 5 are performed with the aid of the controller 50. The controller 50 may be implemented with general or specialized programmable processors that execute programmed instructions. The instructions and data required to perform the programmed functions may be stored in memory associated with the processors or controllers. The processors, their memories, and interface circuitry configure the controllers and/or print engine to perform the functions, such as the processes for identifying printhead positions and compensation factors described above. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits. Controller 50 may be operatively coupled to the print bar and printhead actuators of color units 21A-21D in order to adjust the position of the print bars and printheads along the cross-process axis of the media web.

The imaging system 5 may also include an optical imaging system 54 that is configured in a manner similar to that described above for the imaging of the printed web. The optical imaging system is configured to detect, for example, the presence, intensity, and/or location of ink drops jetted onto the receiving member by the inkjets of the printhead assembly. The light source for the imaging system may be a single light emitting diode (LED) that is coupled to a light pipe that conveys light generated by the LED to one or more openings in the light pipe that direct light towards the image substrate. In one embodiment, three LEDs, one that generates green light, one that generates red light, and one that generates blue light are selectively activated so only one light shines at a time to direct light through the light pipe and be directed towards the image substrate. In another embodiment, the light source is a plurality of LEDs arranged in a linear array. The LEDs in this embodiment direct light towards the image substrate. The light source in this embodiment may include three linear arrays, one for each of the colors red, green, and blue. Alternatively, all of the LEDS may be arranged in a single linear array in a repeating sequence of the three colors. The LEDs of the light source may be coupled to the controller 50 or some other control circuitry to activate the LEDs for image illumination.

The reflected light is measured by the light detector in optical sensor 54. The light sensor, in one embodiment, is a linear array of photosensitive devices, such as charge coupled devices (CCDs). The photosensitive devices generate an electrical signal corresponding to the intensity of light received by the photosensitive devices. The linear array that extends substantially across the width of the image receiving member. Alternatively, a shorter linear array may be configured to translate across the image substrate. For example, the linear array may be mounted to a movable carriage that translates across image receiving member. Other devices for moving the light sensor may also be used.

Figure 1:
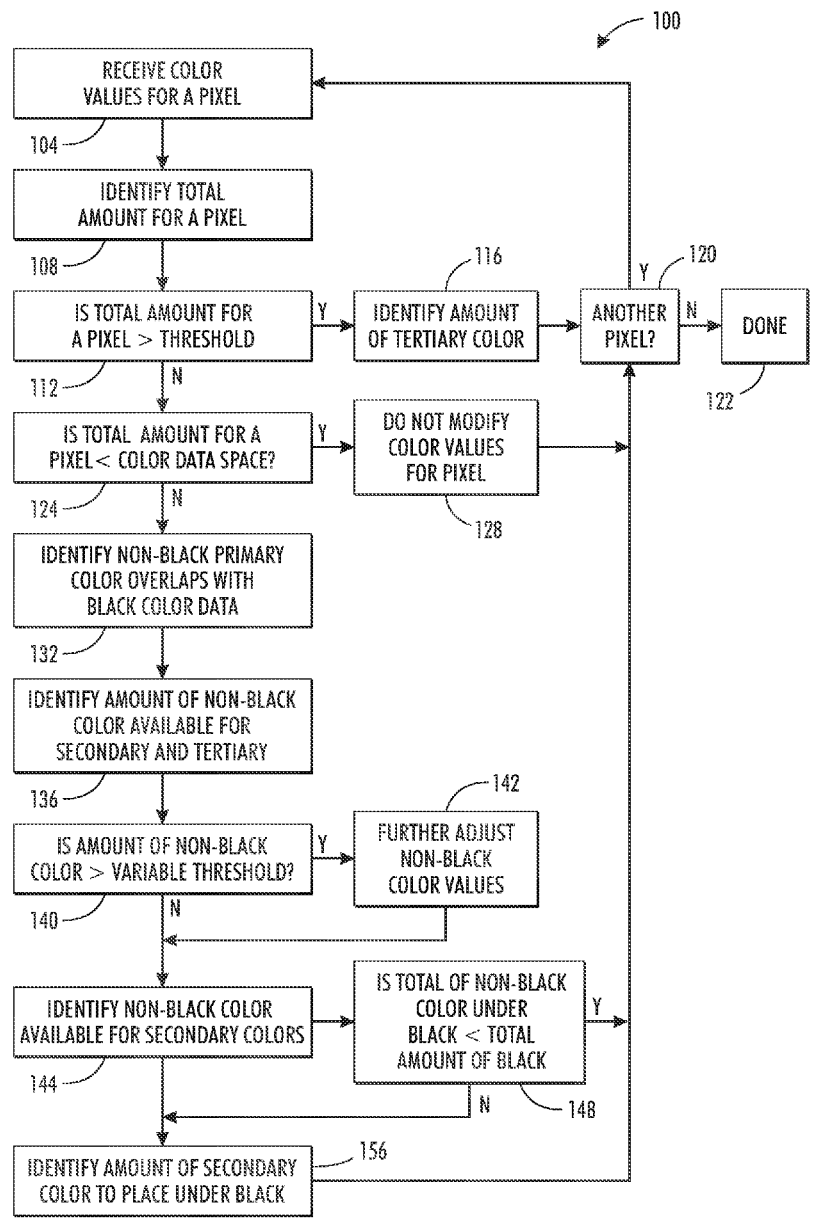
FIG. 1 is a block diagram of a process for converting color values for pixels that are used for color rendering in a printer.

Referring to FIG. 1, a process 100 for converting primary color values for a pixel to primary, secondary, tertiary, and quaternary color values for the pixel is shown in FIG. 1. This process is performed to generate these color values and these color values are used by another known process to assign a color to a pixel as well as the amounts of differently colored inks to produce the assigned color. The process to generate the color values for the assigning process may be implemented by one or more processors executing programmed instructions stored in a memory within printer, although the process may be performed offline from the printer by another computer. As used in this document, "primary colors" refer to the individual colors used to form a pixel in a printed image. In the embodiment discussed below, the primary colors for pixels are cyan, magenta, yellow, and black. These colors are typically identified with the letters C M Y K, in which each letter represents one of the primary colors, respectively. Additionally, as used in this document, "non-black ink" or "non-black color" refers to ink or C M Y data values used to generate secondary colors. Also, as used in this document, "under black" refers to non-black color ink that is combined with black ink on the ink receiving surface.

The process 100 begins by receiving from a memory a color value for each primary color to be printed for a pixel (block 104). The memory may be one of the memories noted above that are operatively connected to a controller in the printer. Alternatively, the color values for the primary colors for a pixel may be received from a scanner or application program that generated color separations for an image to be printed. The process continues by identifying a total amount of ink to be ejected for the pixel (block 108). The total amount of ink corresponds to the sum of the data values for each color for the pixel. This total value is compared to a threshold that corresponds to the largest possible data value for a single primary color (block 112). In an embodiment have four colors, one of which is black, the threshold is a value that is three times the largest possible data space for a primary color. In one embodiment, the largest possible data space for each primary color is an eight bit value so the largest possible data space is 255. Thus, the total amount of ink for a pixel in this embodiment is compared to 3×255, which is 765. If the sum of the color data values is equal to or greater than this threshold, then the output for the pixel consists of quaternary and tertiary colors only. The amount of the tertiary color with black color, which is the quaternary color, is computed (block 116) and is the amount of the sum over the threshold, which is 765 in the embodiment being discussed. The remaining primary colors and remaining space in the threshold space are then used to identify the tertiary colors. The remaining space is the difference of the largest possible data value for a single color, which in the embodiment being discussed is 255, minus the amount of quaternary color and a remaining primary color is the difference between each original primary color value and the amount of quaternary color. Each color is subtracted from the remaining space to determine the tertiary color that does not contain that color separation. The process continues by determining whether another pixel is to be processed (block 120). If another pixel is to be processed, the process continues for the next pixel (block 104). Otherwise, the process is finished (block 122).

If the amount of total color data is not greater than the threshold, the amount of color data is compared to the largest possible data space for a single color value (block 124). In the embodiment being discussed, this threshold would be 255. If the total amount of color for the pixel is less than this threshold, the data value for each color for the pixel is left alone and no secondary, tertiary, or quaternary colors are generated (block 128). The process continues by determining whether another pixel is to be processed (block 120). If another pixel is to be processed, the process continues for the next pixel (block 104). Otherwise, the process is finished (block 122).

If the amount of color data is equal to or greater than the largest possible data space for a single color value, then combined colors are required. To begin the identification of the combined colors, the primary color overlaps with black are computed (block 132). The primary color overlaps are computed by the amount of the largest possible data space for a single color that is not allocated to black. In the embodiment being discussed, this value would be 255 minus the black color value. The resulting value is then subtracted from each non-black color value to identify the amount of forced overlap between the primary color and black. The amount of forced overlap for each non-black color is summed with the amount of forced overlap for the other non-black colors to identify an amount of non-black color to be placed under black. The amount of forced overlap for a non-black color is subtracted from the original data value for the non-black color to identify an amount of the non-black color available for secondary and tertiary colors (block 136). This amount of non-black color may be compared to a variable threshold to identify further amounts of non-black ink that may be placed under black (block 140). If the amount of non-black color available for secondary and tertiary colors is greater than the variable threshold, then each non-black color value is further adjusted. In the embodiment being discussed, the non-black color values are adjusted by subtracting the amount of non-black color available for secondary and tertiary colors that is greater than the variable threshold from the amount of non-black color available for secondary and tertiary colors (block 142). The variable threshold may be set with reference to an image quality mode for the image being generated. In some instances when the image quality mode is high, then the amount of color under black is low and tertiary colors are not printed under black. In some instances of low image quality modes, then more color under black is need to get the output image adequately dark so more non-black color is put under black.

After the amount of non-black color to be placed under black and the amount of non-black color that is available for secondary and tertiary color are identified, the process determines how much of the non-black color values available for secondary and tertiary colors may be used for secondary colors (block 144). Once the secondary color values are identified, the process sums the amount of the non-black colors under black and compares them to the total amount of black color (block 148). If the amount of the non-black colors under black is less than the total amount of black color, then the identified amounts of the non-black colors are set and the process continues by determining the amounts of non-black secondary colors, which is discussed below, and then proceeds to determine whether another pixel is to be processed (block 120). If another pixel is to be processed, the process continues for the next pixel (block 104). Otherwise, the process is finished (block 122). If the amount of non-black colors under black is equal to or greater than the total amount of black color, the process identifies the amount of secondary colors that are to be placed under black (block 156). The method for determining the amount of secondary colors placed under black is the same as the method for determining the secondary colors not placed under black, which is described below. The process then continues by determining whether another pixel is to be processed (block 120). If another pixel is to be processed, the process continues for the next pixel (block 104). Otherwise, the process is finished (block 122).

The amount of secondary colors is determined from the remaining non-black color values. The remaining value for each non-black color is determined by reducing the original non-black color value by the amount of that non-black color under black and the amount of tertiary color. The remaining space is the non-black space less the amount of tertiary. The amount by which the sum of the remaining values for any pair of non-black color values exceeds the remaining space, as calculated above, is converted to the secondary color formed from the combination of the pair of colors. This conversion is done for each pair of non-black colors. The remaining space is reduced by the amount of these secondary colors and the remaining value of each non-black color is reduced by the amount of that non-black color contributed to each secondary color formed with that non-black color. Any remaining values for the non-black colors are assigned as follows. The amount of additional secondary color is the amount by which the remaining values of the primary colors exceed the space remaining. These values can be assigned in one method in proportion to the values determined from the non-black colors. In a second method, these values are assigned with referenced to a priority ordering of the secondary colors or a combination of the two non-black colors for a secondary color. An example of the first method produces a proportion for each secondary color from the product of the minimum value of non-black colors forming the secondary color times the difference of the remaining space and the non-black color not forming that secondary color. Each secondary color is assigned in proportion to that product. The second method ranks the secondary colors and assigns as much of the highest ranking secondary color as possible. The amount of secondary color assigned is determined by the smaller value of the non-black colors forming the secondary color or the amount of additional secondary color needed. The value for the highest ranking secondary color is subtracted from each primary color and the additional secondary color needed and then a value for the next ranking secondary color is identified in the same manner. This process continues until all of the secondary color needed is generated or no primary color value remains. One embodiment may combine these two methods by assigning a proportion, such as half by the first method, and the rest of the secondary color by the second method.

As noted above, the color values generated by the process in FIG. 1 are used by another process to render the color separations. Rendering includes the assigning of a color to each pixel to be printed as well as the amounts of each differently colored ink to produce the assigned color. Rendering may be performed with the use of a stochastical halftone screen as is well known. One known method of rendering uses a thresholding process in which the darkest color value is compared to a threshold. If the color value is equal to or greater than the threshold, then the pixel is assigned the color of the darkest color value. If the value does not exceed the threshold, the next darkest color is added to darkest color value and the comparison to the threshold is made again. If the sum is equal to or greater than the threshold, then the pixel is assigned the color of the last added color value. If the sum does not exceed the threshold, the next darkest color is added to the sum and the new sum is compared to the threshold. This process continues until the pixel is assigned a color corresponding to the color value added to the sum when the sum exceeds the threshold. If the sum does not exceed the threshold, then the pixel is assigned the color white, which means the pixel is not printed.

While the color values generated by the process in FIG. 1 may be used to render color separations, other adjustments may be made before the color rendering is performed. One such adjustment is the modification of the overlap range prior to the calculation of the forced overlap values for individual non-black colors discussed above. This adjustment improves color stability in the presence of color to color alignment errors by avoiding the situation in which the two primary colors completely fill the available space with no overlap. A selected overlap parameter is modified in response to one of two selected primary colors being less than the selected overlap parameter or the difference between a data space for a single color and one of the two selected primary color values being less than the selected overlap parameter. The comparisons of these values to the overlap parameter determine where the color overlap starts and the amount above the color overlap start used for the calculation of the forced overlap described above. This range defined by color overlap start position in the data space and the length of data space on each side of the start position that corresponds to the overlap parameter is the overlap modification range. The overlap parameter value in any calculation may be reduced to the minimum of the following: the overlap parameter, any of the selected primary color values, and the data space for a single color value minus one or more of the selected primary color values. When the sum of the two selected primary colors is within the overlap modification range, the overlap value is calculated by adding the modified overlap parameter to the sum of the two selected primary colors minus the data space for a single color value. Half of that calculated overlap value is then used as the non-black color overlap when the two selected primary colors are black and one of the non-black colors. Half of that calculated overlap value is then used as the secondary color overlap for the secondary color formed by the two selected primary colors when both of the selected primary color values are non-black. Overlap values other than half-the-value of the calculated overlap value may be used but the half-the-value of the calculated overlap simplifies calculations.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for converting primary color values for a pixel to primary and secondary color values for the pixel comprising:
   receiving from a memory with a print engine operatively connected to the memory a color value for each primary color to be printed for a plurality of pixels;
   determining from the color values for the primary colors for each pixel whether a combined color is to be printed for each pixel by comparing a total amount of primary color for each pixel to a threshold and identifying an amount of quaternary color and an amount of tertiary color for each pixel that has the total amount of primary color being equal to or greater than the threshold;
   identifying with the print engine an amount of non-black color under black color for the pixels having a total amount of primary color being less than the threshold, the identification being made with reference to the color values received from the memory for each primary color for the pixels having the total amount of primary color being less than the threshold;
   identifying with the print engine a total amount of non-black color for secondary colors associated with the pixels having the total amount of primary color being less than the threshold, the identification of the total amount of non-black color for secondary colors being made with reference to the amount of non-black color under black color and the color values received for each primary color for the pixels having the total amount of primary color being less than the threshold; and
   assigning with the print engine a color to be printed for the pixels having the total amount of primary color being less than the threshold with reference to the total amount of non-black color for secondary colors associated with the pixels having the total amount of primary color being less than the threshold to enable generation of a control signal to operate an inkjet ejector to print the pixels having the total amount of primary color being less than the threshold with the assigned color.

2. The method of claim 1 wherein the threshold is three times a maximum value for a data space for a single primary color.

3. The method of claim 1 further comprising:
   comparing a total amount of primary color for the pixels having the total amount of primary color being less than the threshold to a second threshold; and
   identifying the amount of non-black color under black color and the total amount of non-black color for secondary colors for the pixels having the total amount of primary color being less than the threshold in response to the total amount of primary color for the pixels having the total amount of primary color being less than the threshold being equal to or greater than the second threshold.

4. The method of claim 3 wherein the second threshold is a maximum value for a data space for a single primary color.

5. The method of claim 3 wherein the second threshold is a maximum value for a data space for a single primary color.

6. The method of claim 3, the identification of the amount of non-black color under black color and the identification of the total amount of secondary colors for the pixels having the total amount of primary color being less than the threshold further comprising:
   identifying an amount of non-black color overlap for each non-black color with the received color value for black; and
   identifying an amount of non-black color available for secondary color and tertiary color with reference to the identified amount of non-black color overlap for each non-black color.

7. The method of claim 6 further comprising:
   comparing the amount of non-black color available for secondary color and tertiary color to a third threshold; and
   adjusting the received color values for the non-black primary colors in response to the amount of non-black color available for secondary color and tertiary color being equal to or greater than the third threshold.

8. The method of claim 7 further comprising:
   setting the third threshold to a first value in response to detection of a first image quality mode; and
   setting the third threshold to a second value in response to detection of a second image quality mode that prints less non-black color under black than the first image quality mode, the first value being greater than the second value.

9. The method of claim 7 further comprising:
   identifying an amount of non-black color under black color with reference to the adjusted color values for the primary colors.

10. The method of claim 9 further comprising:
    comparing the identified amount of non-black color under black color to the received color value for the black primary color; and
    identifying an amount of non-black color available for secondary colors with reference to the adjusted color values for the primary colors in response to the identified amount of non-black color under black color being equal to or greater than the received color value for the black primary color.

11. The method of claim 6 further comprising:
    adjusting an amount of color from which the amount of non-black color overlap is identified.

12. The method of claim 6 further comprising:
    selecting an overlap parameter;
    selecting two primary color values;
    modifying the overlap parameter in response to one of the two primary color values or a difference between a data space for a single color and one of the two primary color values being less than the selected overlap parameter; and
    modifying the identified amount of non-black color overlap in response to a sum of the two selected primary color values being within an overlap modification range identified by the modified overlap parameter.

13. A method for converting primary color values for a pixel to primary and secondary color values for the pixel comprising:
    receiving from a memory with a print engine operatively connected to the memory a color value for each primary color to be printed for a plurality of pixels;
    determining from the color values for the primary colors for each pixel whether a combined color is to be printed for each pixel by comparing a total amount of primary color for each pixel to a threshold and identifying the amount of non-black color under black color and the total amount of non-black color for secondary colors for the pixels having the total amount of primary color being less than the threshold;

identifying with the print engine an amount of non-black color under black color for the pixels having a total amount of primary color being less than the threshold, the identification being made with reference to the color values received from the memory for each primary color for the pixels having the total amount of primary color being less than the threshold;

identifying with the print engine a total amount of non-black color for secondary colors associated with the pixels having the total amount of primary color being less than the threshold, the identification of the total amount of non-black color for secondary colors being made with reference to the amount of non-black color under black color and the color values received for each primary color for the pixels having the total amount of primary color being less than the threshold; and assigning with the print engine a color to be printed for the pixels having the total amount of primary color being less than the threshold with reference to the total amount of non-black color for secondary colors associated with the pixels having the total amount of primary color being less than the threshold to enable generation of a control signal to operate an inkjet ejector to print the pixels having the total amount of primary color being less than the threshold with the assigned color.

14. The method of claim 13, the identification of the amount of non-black color under black color and the identification of the total amount of non-black color for secondary colors for pixels having the total amount of primary color being less than the threshold further comprising:

comparing a total amount of primary color for the pixels having the total amount of primary color being less than the threshold to a second threshold; and identifying an amount of quaternary color and an amount of tertiary color for the pixels having the total amount of primary color being less than the threshold in response to the total amount of primary color for the pixel being equal to or greater than the second threshold.

15. The method of claim 14 wherein the threshold to which the total amount of primary color is compared is three times a maximum value for a data space for a single primary color.

16. A printer comprising:

a print station having at least one printhead that is configured to eject liquid ink onto an image receiving surface;

a controller configured to generate firing signals to operate the at least one printhead to eject ink onto the image receiving surface; and a print engine configured to receive a color value for each primary color to be printed for a plurality of pixels, to determine from the color values for the primary colors for each pixel whether a combined color is to be printed for each pixel, to identify an amount of non-black color under black color for the pixels having a total amount of primary color that is less than a threshold, the identification being made with reference to the color values received for each primary color for the pixels having the total amount of primary color that is less than the threshold, to identify a total amount of non-black color for secondary colors for the pixels having the total amount of primary color that is less than the threshold, the identification of the total amount of non-black color for secondary colors being made with reference to the amount of non-black color under black color and the color values received for each primary color for the pixels having the total amount of primary color that is less than the threshold, and to modify the amount of non-black color under black with an amount of secondary color under black.

17. The printer of claim 16, the print engine being further configured to identify the amount of secondary color with reference to a remaining value for each non-black color.

18. The printer of claim 16, the print engine being further configured to identify the amount of secondary color with reference to a priority assigned to each secondary color possible from a remaining value for each non-black color.

19. The printer of claim 16, the print engine being further configured to identify a portion of the amount of secondary color with reference to a remaining value for each non-black color and another portion of the amount of secondary color with reference to a priority assigned to each secondary color possible from a remaining value for each non-black color.

* * * * *